United States Patent

[11] 3,584,307

[72] Inventor David W. Hewie
Kitchener, Ontario, Canada
[21] Appl. No. 677,673
[22] Filed Oct. 24, 1967
[45] Patented June 8, 1971
[73] Assignee Electrohome Limited
Kitchener, Ontario, Canada

[54] AUTOMATIC MOTOR SHUTOFF NETWORKS FOR SIGNAL SEEKING RECEIVERS
9 Claims, 4 Drawing Figs.

[52] U.S. Cl. 325/471, 325/469, 325/456, 334/20
[51] Int. Cl. H04b 1/34
[50] Field of Search 325/471, 470, 469, 468, 335, 336, 392, 362; 334/11, 20, 21, 22, 23, 24, 25; 318/17; 178/6, 5.8

[56] References Cited

UNITED STATES PATENTS

| | | | |
|---|---|---|---|
| 3,029,305 | 4/1962 | Marks et al. | 178/5.8 |
| 2,745,015 | 5/1956 | Stillman | 325/471 |
| 3,334,187 | 8/1967 | Pampel | 325/470 X |

OTHER REFERENCES

G.E. Transistor Manual, 7th Edition, 1964, PP 200— 201

*Primary Examiner*—Robert L. Griffin
*Assistant Examiner*—Benedict V. Safourek
*Attorney*—Peter W. Mc Burney

ABSTRACT: A signal seeking receiver has variable tuning means for varying the tuning of the receiver and a motor drivingly connected to the tuning means. An automatic shutoff network automatically turns off the motor when the receiver is tuned to the frequency of a signal being received by the receiver and of a strength greater than a minimum predetermined signal strength. The automatic shutoff network is a monostable multivibrator that automatically turns off the motor after it has been operating for a predetermined period of time without the receiver having been tuned to one such received signal during the period.

*INVENTOR.*
DAVID W. HEWIE

*BY*

Agent

INVENTOR.
DAVID W. HEWIE

BY

Agent

AUTOMATIC MOTOR SHUTOFF NETWORKS FOR SIGNAL SEEKING RECEIVERS

This invention relates to radio receivers of the signal seeking type. More particularly, this invention relates to networks for automatically turning off the motor of a signal seeking receiver (a) when the receiver is tuned to the frequency of a signal being received by the receiver and of a strength greater than a minimum predetermined signal strength, and (b) after the motor has been operating for a predetermined length of time.

In any signal seeking receiver it is necessary to provide some means for turning on the motor that drives the tuning condenser of the receiver when the latter is turned on but no signal is being received, or when it is desired to change stations. These means must be capable of automatically shutting off the motor when the receiver is tuned to a signal of a level greater than a minimum predetermined level. It also would be desirable to provide means for shutting off the motor automatically after it has been operating for some predetermined length of time. This will ensure that the motor will not run indefinitely should any one of the following conditions be encountered: (a) signals being received of insufficient signal strength; (b) antenna disconnected; or (c) top of sensitivity control set too low. In accordance with this invention, a network is provided for accomplishing the foregoing objectives.

A signal seeking receiver embodying this invention is of a type having variable tuning means for varying the tuning of the receiver, a motor drivingly connected to the tuning means, whereby the tuning of the receiver can be changed by operation of the motor, and an automatic shutoff network for automatically turning off the motor when the receiver is tuned to the frequency of a signal being received by the receiver and of a strength greater than a minimum predetermined signal strength. In accordance with this invention, the automatic shutoff network is a monostable (one-shot) multivibrator that automatically turns off the motor after it has been operating for a predetermined period of time without the receiver having been tuned to one such received signal during the aforementioned period.

This invention will become more apparent from the following detailed description, taken in conjunction with the appended drawings, in which.

Figure 1:
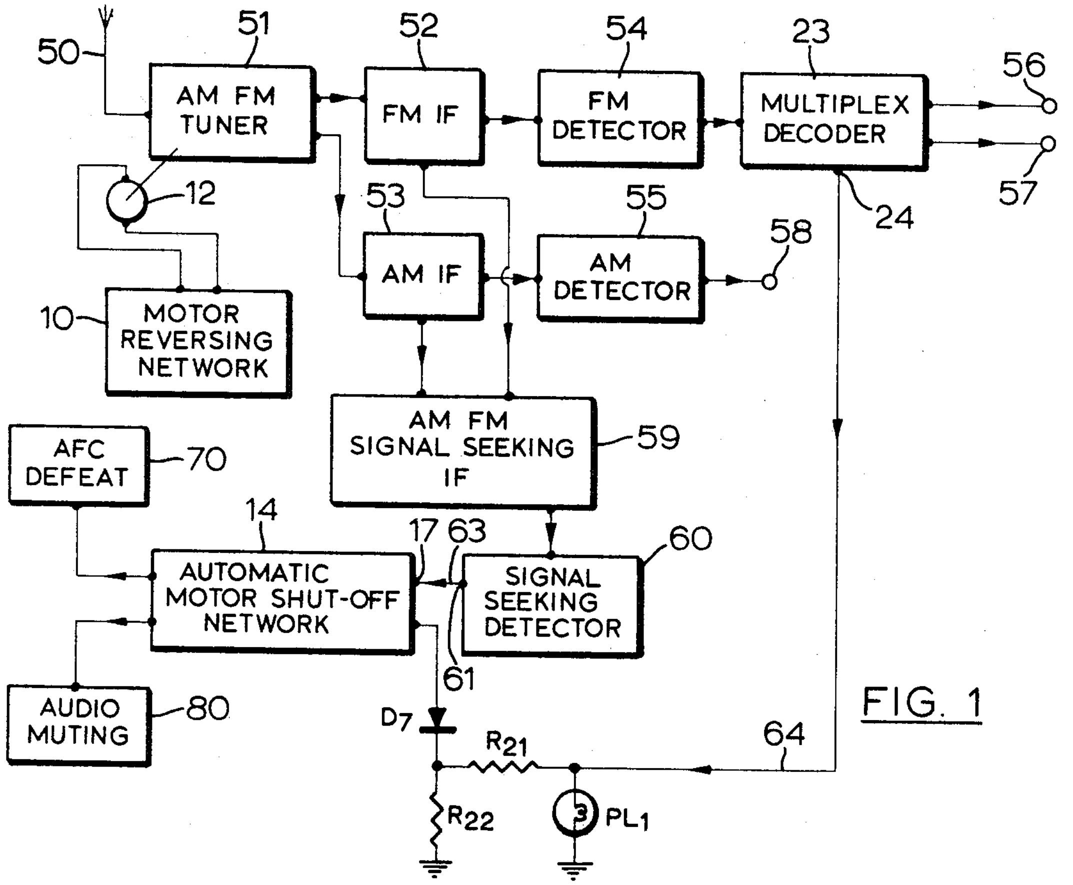
FIG. 1 is a block diagram of a part of a conventional AM–FM receiver modified in accordance with this invention.

The receiver of FIG. 1 is constituted in part by a conventional AM–FM receiver consisting of an antenna 50, an AM–FM tuner 51, FM and FM IF circuits 52 and 53 respectively, FM and AM detectors 54 and 55 respectively and a multiplex decoder 32 all connected as shown in the FIG. Audio output signal terminals 56, 57 and 58 are connected to loudspeakers (not shown).

Signals derived from FM and AM IF circuits 52 and 53 respectively are supplied to an AM–FM signal seeking network 59 having its output terminal connected to a signal seeking detector 60. These latter components may be of a type known in the art and operate in such a manner as to produce a signal at output terminal 61 of detector 60 when the receiver is tuned to a signal at a level greater than a predetermined level.

Signals from detector 60 and decoder 32 may be supplied to an automatic motor shutoff network 14 embodying this invention via conductors 63 and 64 respectively.

Network 14 may be connected to an A.F.C. defeat network 70 and an audio muting network 80. It also supplies motor control signals to control the operation of a motor 12 that drives the tuning capacitor (not shown) of tuner 51. This is shown in detail in FIG. 1.

Figure 2:
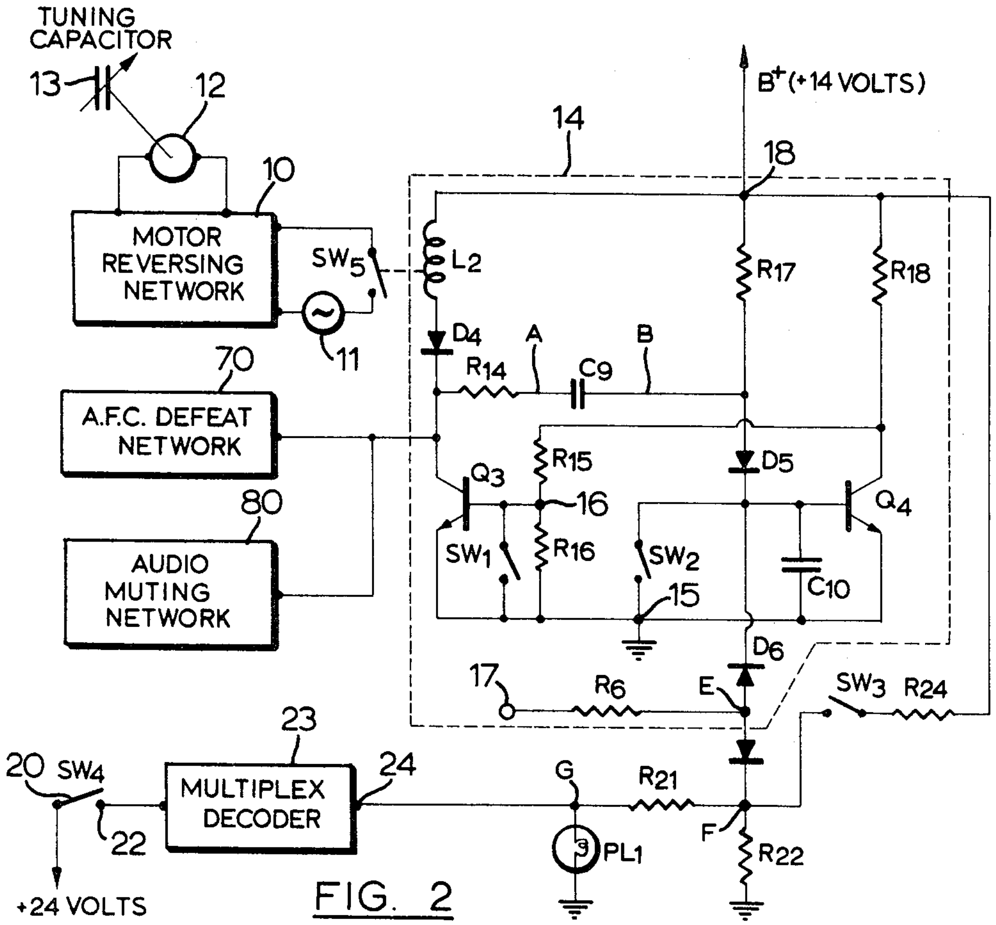
FIG. 2 is a circuit diagram showing one form of an automatic motor shutoff network embodying this invention.

Referring now to FIG. 2, which shows some of the components of FIG. 1, motor 12 has its drive shaft connected to the tuning capacitor 13 of tuner 51 of the signal seeking receiver of FIG. 1, and power to operate motor 12 is provided from any suitable AC or DC source, an AC source being schematically shown in FIG. 2 in the form of an AC generator 11.

Generator 11 supplies power to motor 12 via the contacts SW5 (when closed) of a relay having a coil L2 and via motor reversing network 10, which may be of a conventional type. It should be noted that motor reversing network 10 is not essential to the operation of a signal seeking receiver embodying this invention, since, when tuning capacitor 13 reaches the limits of its travel in one direction, it could be returned manually to the other limit of its travel.

The automatic shutoff network 14 of FIG. 1 is shown within the dotted line 14 in FIG. 2 and is a monostable (one-shot) multivibrator that employs two transistors Q3 and Q4. While transistors Q3 and Q4 are shown at being NPN transistors, it will be appreciated by those skilled in the art, that will appropriate changes in the polarity of the voltages employed, PNP transistors may be substituted for the NPN transistors Q3 and Q4. What could be referred to as the basic monostable multivibrator circuit consists of coil L2, capacitor C9, resistors R15, R16, R17 and R18 and transistors Q3 and Q4. The additional components employed in FIG. 2, i.e., diodes D4 and D5, resistor R14 and capacitor C10 are added to the basic monostable multivibrator circuit to improve the operation of the automatic shutoff network. As shown in FIG. 2, resistor R18 is connected between a source of positive DC potential (B+) and the collector electrode of transistor Q4. Resistors R15 and R16 are connected in series circuit with each other between the collector electrode of transistor Q4 and a terminal 15 that is grounded. The common terminal 16 of resistors R15 and R16 is connected to the base electrode of transistor Q3. One terminal of resistor R17 is connected to terminal 18 (B+), while the other terminal of resistor R17 is connected to the anode of diode D5, the cathode of diode D5 being connected to the base electrode of transistor Q4. Connected between B+ and the anode of diode D5 is a series circuit consisting of the following components in the order named: coil 12, diode D4, resistor R14 and capacitor C9. One terminal of resistor R14 is connected to the cathode of diode D4, and this terminal also is connected to the collector electrode of transistor Q3. The emitter electrodes of both transistors Q3 and Q4 are connected to grounded terminal 15. A switch SW1 is connected between the base electrode of transistor Q3 and grounded terminal 15, while a switch SW2 is connected between the base electrode of transistor Q4 and grounded terminal 15. Capacitor C10 is connected between the base and emitter electrodes of transistor Q4. A signal input terminal 17 is connected to the base electrode of transistor Q4 via a resistor R6 and a diode D6. The signal applied to signal input terminal 17 may be derived from any one of the IF amplifiers, for example, of the receiver of FIG. 1, further amplified, if necessary, and then detected to provide a positive DC signal, the latter being applied to signal input terminal 17.

The operation of the network of FIG. 2 just described now will be discussed. When relay contacts SW5 are closed, generator 11 will be connected to motor 12 via closed contacts SW5 and motor reversing network 10, and motor 12 will drive tuning capacitor 13 to change the tuning of the receiver. Motor reversing network 10 can include microswitches that are operated when the tuning capacitor reaches the limits of its travel in both directions, operation of the microswitches causing motor 12 to reverse direction.

Transistors Q3 and Q4 are so interconnected that when transistor Q4 is turned on, transistor Q3 is kept turned off, and when transistor Q3 is turned on, transistor Q4 is kept turned off, but the latter condition is not a stable condition, and, after a predetermined period of time during which transistor Q3 is turned on, this transistor will automatically turn off, causing transistor Q4 to turn on. The state of the monostable multivibrator when transistor Q4 is turned on and transistor Q3 is turned off is the one stable state of the monostable multivibrator.

The collector and emitter electrodes of transistor Q3 are connected in a circuit through which current required in order for motor 12 to operate must flow. In this respect, motor 12 only can operate provided that transistor Q3 is turned on. Only under these conditions will sufficient current pass from the DC power supply (B+) through coil L2, diode D4 and the collector and emitter electrodes of transistor Q3 to ground to close relay contacts SW5. Of course, rather than employing a relay, transistor Q3 could be connected in a circuit through which either the armature or the field current of motor 12 must pass. Such an arrangement is shown, for example, in copending application Ser. No. 602,944, filed Dec. 19, 1966, for Automatic Motor Shut-off Networks For Signal Seeking Receivers—Jacob Buhr.

Assuming that there is no signal present at signal input terminal 17, and that switches SW1 and SW2 are both open, when a positive DC potential, B+, which may be, say, +4 volts is applied to terminal 18, transistor Q4 will be biased on. This transistor also will be biased on in the event that a positive DC signal is applied to signal input terminal 17. With transistor Q4 turned on, transistor Q3 will be kept off, and, since transistor Q3 must be turned on before motor 12 can start, motor 12 will not operate.

The path for the current required to turn on transistor Q4 includes coil L2, diode D4, resistor R14, capacitor C9, diode D5 and the base-emitter junction of transistor Q4. When B+ is applied to terminal 18, a current will flow through coil L2 and capacitor C9 to the base electrode of transistor Q4 causing transistor Q4 to conduct immediately. The current that will flow through the aforementioned path under these circumstances is insufficient, however, to cause contacts SW5 to close. It is very important that transistor Q4 turn on before transistor Q3 when B+ is applied to terminal 18. If transistor Q3 turned on first, transistor Q4 would lose its control function. As soon as transistor Q4 turns on, the collector electrode of transistor Q4 will be at almost ground potential, thus ensuring that transistor Q3 will be biased off via resistors R15 and R16. This ensures that transistor Q3 cannot turn on, which, in turn, means that any current flowing through coil L2 will be insufficient to close contacts SW5, so motor 12 cannot start. Transistor Q4 remains turned on, after the charge on capacitor C9 has equalized, by current flowing from B+ via resistor R17 and diode D5 to the base electrode of transistor Q4. It will be seen from the foregoing that inadvertent motor operation is prevented when power is applied to network 14. This result is achieved by virtue of the fact that transistor Q4 has no emitter resistance to permit degeneration and coil L2 and capacitor C9 are of sufficiently low impedance to ensure that transistor Q4 will turn on before transistor Q3.

It now will be assumed that B+ has been applied to terminal 18, and quiescent conditions are present with transistor Q4 turned on and transistor Q3 cut off. Under these circumstances, there will be a DC voltage across capacitor C9 approximately equal to B+, since point B will be at substantially ground potential offset only by the base-emitter voltage drop of transistor Q4 and the forward voltage drop of diode D5. On the other hand, point A will be at substantially B+ potential offset only by the forward voltage drop of diode D4, because there will be virtually no voltage drop across coil L2 when transistor Q3 is turned off. When the base electrode of transistor Q4 is momentarily grounded by closing switch SW2, transistor Q4 will turn off, and its collector voltage will rise. Under these circumstances, transistor Q3 will be biased on via resistors R15 and R16, and transistor Q3 will conduct permitting sufficient current to flow through coil L2 to close contacts SW5 causing motor 12 to operate. Since point A now will be close to ground potential offset only by the collector-emitter saturation voltage of transistor Q3, point B then will be negative with respect to ground by an amount equal to the original charge voltage on capacitor C9. Thus, transistor Q4 will be held cut off by the negative voltage at point B, and motor 12 will continue to run. The operation is depicted graphically in FIG. 3 where part 50 of curve 51 shows the voltage at point B during conduction of transistor Q4, and part 52 of curve 51 shows how point B becomes negative when switch SW2 is momentarily closed causing transistor Q4 to turn off and transistor Q3 to turn on.

Figure 3:
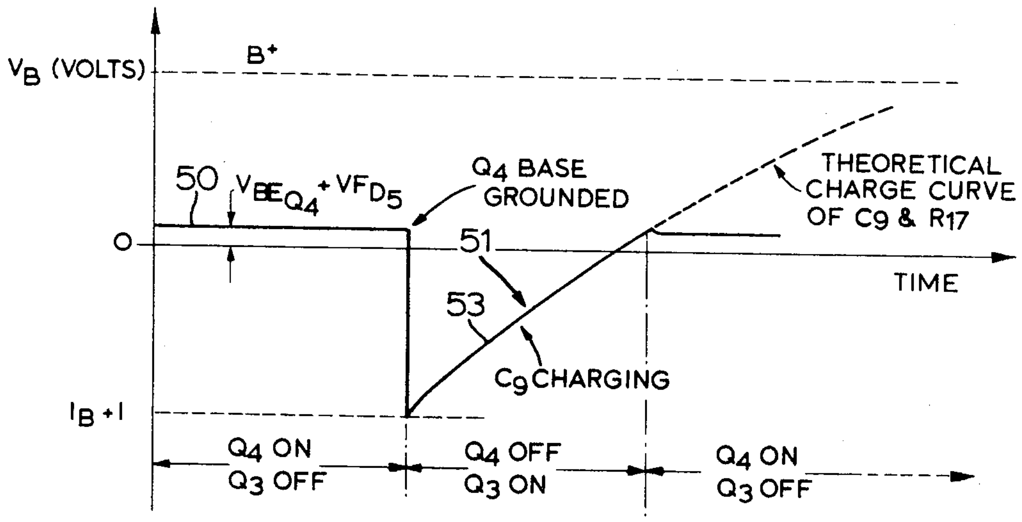
FIGS. 3 and are graphs of voltage plotted against time showing the voltages appearing at points designated B and G in the network of FIG. 2.

An unstable charge condition now exists insofar as capacitor C9 is concerned, and, as shown by part 53 of curve 51 of FIG. 3, the voltage at point B will commence rising exponentially towards B+ as a result of charging of capacitor C9 towards B+ via resistor R17. As shown in FIG. 3, the potential at point B rises exponentially until it reaches a slight positive potential, at which point transistor Q3 will turn off causing transistor Q4 to turn on. Transistor Q4 then saturates, insufficient current flows through coil L2 to keep contacts SW5 closed, these contacts open, and motor 12 stops. It will be seen from the foregoing, that motor 12 will run for a predetermined length of time and then cease operating. It should be noted that since the relatively steep initial portion of the curve for charging capacitor C9 via resistor R17 is employed, the timing error will be small for given component tolerances of capacitor C9 and resistor R17. It will be understood, of course, and as will be explained hereinafter in greater detail, if during the time that transistor Q4 is turned off and transistor Q3 is turned on, a signal is applied to input terminal 17 and is above a minimum predetermined signal strength, this will cause transistor Q4 to turn on and transistor Q3 to turn off causing motor 12 to stop, as a result of which the receiver will remain tuned to the signal being received.

Since transistor Q3 will turn off after capacitor C9 has attained the positive potential shown in FIG. 3, capacitor C9 will return to its original charge condition by current flow from B+ via coil L2, diode D4, resistor R14, diode D5 and the base-emitter junction of transistor Q4.

Resistor R17 and capacitor C9 may be selected to give any desired motor running period. This period may be, say, 30 seconds, which is quite ample to give the receiver sufficient time to find a signal if one is present.

While, in the preceding discussion, the starting of motor 12 was initiated by momentarily closing switch SW2, the starting of motor 12 also could be accomplished by the application of a momentary positive voltage to the base electrode of transistor Q3. It also is possible to interrupt the motor running period, as will be discussed hereinafter in greater detail, by applying a positive voltage to the base electrode of transistor Q4, thereby turning transistor Q4 on and transistor Q3 off, or by grounding the base electrode of transistor Q3 by closing switch SW1. Closure of switch SW1 provides a means whereby the receiver may be locked in on any given signal to which the receiver is tuned.

Diode D5 serves a number of functions. As shown by part 52 of curve 51 in FIG. 3, when transistor Q4 turns off and transistor Q3 turns on, a large negative voltage appears at point B, and, if point B were directly connected to the base electrode of transistor Q4, this voltage might exceed the base-emitter reverse bias breakdown voltage of the silicon transistor Q4. Even if transistor Q4 were not damaged by this voltage, provided that it did exceed the base-emitter reverse bias breakdown voltage, point B would clamp at this negative voltage resulting in a very short motor operating period. The addition of diode D5, which has a high reverse bias breakdown voltage, between point B and the base electrode of transistor Q4 entirely eliminates this problem, because, since point B becomes highly negative, diode D5 will be reversed biased, thereby isolating transistor Q4 from capacitor C9. The isolation of the base electrode of transistor Q4 from the low AC impedance of capacitor C9 and coil L2 permits easy and positive turn-on of transistor Q4 as a result of signals applied to signal input terminal 17. As noted hereinbefore, when the base electrode of transistor Q4 is grounded by closing switch SW2, the potential at point B immediately swings highly negative, thus cutting off transistor Q4. Since it is physically impossible to open and close switch SW2 fast enough to beat the voltage swing at point B if it were not for diode D5, capacitor C9 would immediately discharge through switch SW2 and the collector and emitter electrodes of transistor Q3. Then, upon opening of switch SW2, there would be no negative voltage available at the base electrode of transistor Q4 to keep this transistor turned off. Consequently, motor 12 would shut off as soon as switch SW2 was opened. Diode D5 provides isolation of point B and switch SW2 when it is closed, since diode D5 is reversed biased at this time.

Diode D4 also serves a number of functions. Because of the inductive and internal capacitance components present in relay coil L2, a high frequency ringing voltage will appear across coil L2 and would also appear, except for diode D4, at point A when transistor Q3 switches to its cutoff condition. This high frequency voltage would be superimposed on the B+ potential at point A, and the positive peaks of the waveform would be rectified by diode D5 and the base-emitter junction of transistor Q4. This would have the effect of increasing the charge on capacitor C9. Because point A would be clamped at substantially B+, point B would drop in potential and cause transistor Q4 to cutoff. Usually this condition would exist after several rapid on-off cycles have occurred and allowed sufficient charge voltage increase on capacitor C9 to prevent proper saturation of transistor Q4. In this condition, motor 12 could not be shut off until capacitor C9 has returned to its proper charge condition. With the addition of diode D4, point B will be clamped to the base electrode of transistor Q4 by the current flowing through resistor R14, so any increase in the charge on capacitor C9 will reverse bias diode D4 and isolate capacitor C9 from coil L2 and terminal 18. Proper saturation of transistor Q4 therefore will be maintained via resistor R17, transistor Q3 will remain cut off, and motor 12 will stay turned off. In addition, if diode D4 were not present, a drop in B+ due to line voltage variation, for example, would cause point B to drop an equal amount because of the low impedance of capacitor C9. This would result in cutoff of transistor Q4 and the starting of motor 12. With diode D4 present, it will become reversed biased when B+ drops, thereby isolating capacitor C9 from terminal 18 and maintaining proper saturation of transistor Q4. Of course, the polarity of diode D4 is such that normal operation of the relay consisting of coil L2 and contacts SW5 occurs when transistor Q3 saturates.

Resistor R14 limits the peak current in the circuit consisting of coil L2, diode D4, capacitor C9, diode D5 and the base-emitter junction of transistor Q4 when B+ is first applied to the network and also during the period just after motor shutoff when the voltage of the collector electrode of transistor Q3 rises from essential ground potential to essential B+. This prevents damage which might otherwise occur to transistor Q4 if resistor R14 were not present and also prevents momentary closure of contacts SW5 during these high peak current periods. Resistor R14 also greatly reduces the effect of coil L2 ringing and the consequent increase of charge on capacitor C9.

Capacitor C10 prevents false triggering of transistor Q4 during the period when motor 12 is operating by bypassing any noise impulses which might appear on the line between terminal 15 and the base electrode of transistor Q4 that includes switch SW2.

As shown in FIG. 2, a resistor R24 and a switch SW3 are connected in series circuit with each other between terminal 18 and the cathode of a diode D7 having its anode connected to the anode of diode D6. The terminal of resistor R6 opposite to the terminal thereof connected to signal input terminal 17 is connected to the anodes of diodes D6 and D7. A resistor R22 is connected between the cathode of diode D7 and ground. A switch SW4 having a movable contact 20 and a fixed contact 22 is provided. Movable contact 20 is connected to a source of positive DC potential, say, +24 volts. Contact 22 is connected to multiplex decoder 23, which may be of a conventional type. Output terminal 24 of decoder 23 is the output terminal of the stereo lamp switching circuit of the decoder and is connected to one terminal of a stereo indicator lamp PL1, the other terminal of this lamp being grounded. A resistor R21 is connected between the ungrounded terminal of lamp PL1 and the ungrounded terminal of resistor R22.

If it is desired to listen only to stereo reproduction of stations broadcasting stereophonic signals, movable contact 20 should be engaged with fixed contact 22 and switch SW3 should be open. On the other hand, if it is desired to listen to monaural reproduction of stations broadcasting AM signals as well as to stations broadcasting FM monaural signals and to stereo reproduction of FM stereophonic signals, switch SW3 should be closed and contact 20 should engage contact 22. Under these circumstances, there will be a positive voltage at point F, and by properly selecting resistors R24 and R22, this positive voltage can be made sufficient to reverse bias diode D7. If motor 12 is assumed to be operating, when the receiver becomes tuned to a signal above a predetermined minimum signal strength (AM or FM), a positive voltage will be applied to signal input terminal 17 and will cause current to flow through resistor R6, diode D6 and the base-emitter junction of transistor Q4, thus causing transistor Q4 to turn on, transistor Q3 to turn off and motor 12 to stop. All this is made possible, of course, because the positive voltage at point F is higher than the positive voltage at point E, so that diode D7 will be reversed biased. It will be noted that it is only necessary that the voltage at point F be slightly greater than the forward voltage drop across diode D6 and the base-emitter junction of transistor Q4 (about 0.9 volts for a series connected germanium diode and silicon transistor) to ensure that diode D7 is reversed biased.

If the signal to which the receiver is tuned is an FM stereophonic signal, multiplex decoder 23 will switch on causing current to flow from output terminal 24 thereof through lamp PL1 illuminating lamp PL1. The tuning in of an FM stereophonic signal, provided it is above a minimum predetermined signal strength, will cause motor 12 to stop operating, since diode D7 still will be reversed biased. In this respect, it will be noted that any voltage drop across lamp PL1 will serve to additionally reverse bias diode D7.

It should be noted that because the resistance of resistor 21 is much greater than the resistance of lamp PL1, lamp PL1 will not light even with switch SW3 closed.

As mentioned hereinbefore, if it is desired to listen only to stations broadcasting FM stereophonic signals, switch SW3 should be opened and contacts 20 and 22 closed. If an FM monaural signal is received, so that a positive voltage is developed at signal input terminal 17, the result will be current flow through resistor R6, diode D7 and resistor R22 to ground, because diode D7 will not be reversed biased. Insufficient voltage will be developed at point E to cause transistor Q4 to turn on. Consequently, motor 12 will not stop operating when the receiver is tuned to an FM monaural signal. Similarly, it will not stop operating when the receiver is tuned to an AM signal. However, when an FM stereophonic signal having a signal strength greater than a predetermined magnitude is received and the receiver is tuned thereto, decoder 23 will operate and lamp PL1 will illuminate. The voltage developed across lamp PL1 under these circumstances will reverse bias diode D7, thereby permitting current to flow via R6 and diode D6 to the base electrode of transistor Q4. This will cause transistor Q4 to turn on, transistor Q3 to turn off and motor 12 to stop operating.

Figure 4:
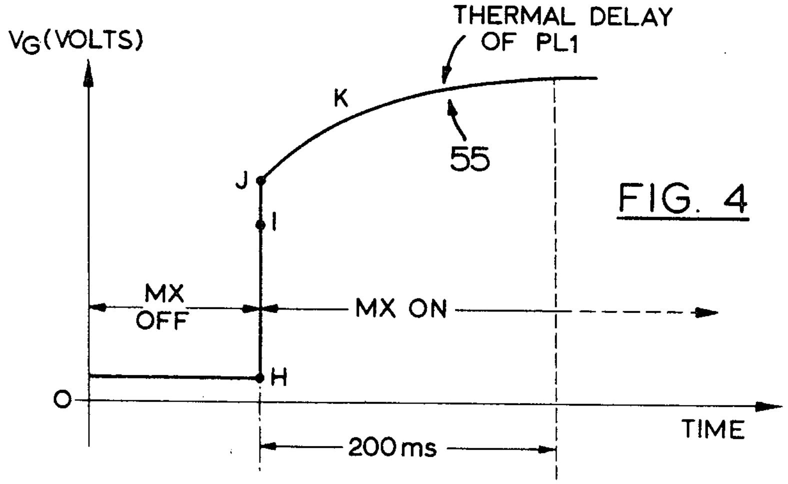

Referring to FIG. 4, when decoder 23 is not operating, there will be a small voltage at point G (FIG. 2). When the receiver is tuned to an FM stereophonic signal, so that both a station carrier and a 19 kHz. pilot carrier are present, decoder 23 will switch on placing a fixed resistance between its source of positive supply voltage and point G. Since lamp PL1 has a finite cold resistance, the voltage at point G will immediately rise to point J in FIG. 4. Part K of the curve 55 shown in FIG. 4 indicates the relatively long thermal delay of lamp PL1 caused by the resistance of the lamp increasing slowly from its initial cold value as the lamp becomes warmer. It is necessary that a point on the vertical portion of curve 55 between points H and J be selected to reverse bias diode D7 in order to allow immediate turnoff of motor 12. Point I may be selected as giving the appropriate voltage at point F as a result of the voltage divider action of resistors R21 and R22.

It may be desirable to automatically mute the audio output of the receiver while signal seeking is taking place, so that noise will not be heard as tuning condenser 13 is moved between one station and the next. To this end, an audio muting network 80 may be connected to the collector electrode of transistor Q3. This audio muting network may be of the type disclosed in copending application Ser. No. 602,942, filed Dec. 19, 1966, or in copending application Ser. No. 602,943, filed Dec. 19, 1966, both for Automatic Muting Networks for Signal Seeking Receivers—Jacob Buhr.

It also may be desirable to automatically defeat, i.e., render inoperative, the A.F.C. circuit of the receiver when signal seeking is taking place, since this permits closer tuning to be obtained than would be possible if the A.F.C. were not defeated. To this end, an A.F.C. defeat network 70 may be connected to the collector electrode of transistor Q3. This A.F.C. defeat network may be of the type disclosed in copending application Ser. No. 602,939, filed Dec. 19, 1966, for A.F.C. Defeat Networks for Signal Seeking Receivers—Jacob Buhr.

By way of example only, the components of FIG. 2 may be of the following types or have the following values

| | |
|---|---|
| Q3—BC109 | R22—10K |
| Q4—S1891 | R24—100H |
| R6—100K | D4—FDM1000 |
| R14—4.7K | D5—FDM1000 |
| R15—22K | D6—IN541 |
| R16—3.3K | D7—IN541 |
| R17—220K | C9—125μf. |
| R18—4.7K | C10—5,000 pf. |
| R21—56K | |

While preferred embodiments of this invention have been disclosed herein, those skilled in the art will appreciate that changes and modifications may be made therein without departing from the scope and spirit of this invention as defined in the appended claims.

What I claim as my invention is:

1. In a signal seeking receiver of a type having variable tuning means for varying the tuning of said receiver, a motor drivingly connected to said tuning means, whereby the tuning of said receiver can be changed by operation of said motor, and an automatic shutoff network for automatically turning off said motor when said receiver is tuned to the frequency of a signal being received by said receiver and of a strength greater than a minimum predetermined signal strength; the improvement wherein said automatic shutoff network comprises a monostable multivibrator network adapted to turn off said motor after said motor has been operating for a predetermined period of time without said receiver having been tuned to one of said received signals during said period, said monostable multivibrator network comprising first and second transistors interconnected such that when either of said transistors is turned on or off, the other of said transistors is kept turned off or on respectively until the state of conduction of the first-mentioned transistor changes, said second transistor being turned on being a stable state of said monostable multivibrator and said first transistor being turned on being an unstable state of said monostable multivibrator; said signal seeking receiver also including means for supplying a first signal to said second transistor when said receiver is tuned to the frequency of a signal being received by said receiver to turn on said second transistor when said first signal is of a strength greater than a minimum predetermined signal strength; means connecting said first transistor in a circuit through which current required in order for said motor to operate must pass, whereby when said first transistor is turned off, said current is unable to flow through said circuit and said motor ceases operating; means for supplying a biasing voltage to said second transistor to turn on said second transistor when said motor is not operating; and switching means having first and second different states and which initiate operation of said motor when in said second state.

2. The invention according to claim 1 wherein said first and second transistors each have base, collector and emitter electrodes, and wherein said monostable multivibrator network also includes first, second, third and fourth resistors, a first capacitor and a coil of a relay having contacts in circuit with said motor, said first resistor being connected between said means for supplying said biasing voltage and said collector electrode of said second transistor, said second resistor being connected between said means for supplying said biasing voltage and said base electrode of said second transistor, said third and fourth resistors being connected in series circuit with each other between said collector electrode of said second transistor and a terminal at a reference potential, said third and fourth resistors having a common terminal connected to said base electrode of said first transistor, said coil being connected between said means for supplying said biasing voltage and said collector electrode of said first transistor, said first capacitor being connected between said collector electrode of said first transistor and said base electrode of said second transistor, and means connecting said emitter electrodes of said first and second transistors and said terminal at said reference potential.

3. The invention according to claim 2 wherein said monostable multivibrator network includes first and second diodes, said first diode being connected in a series circuit with said coil between said means for supplying said biasing voltage and said collector electrode of said first transistor and also in a series circuit with said coil and said first capacitor between said means for supplying said biasing voltage and said base electrode of said second transistor, said second diode also being connected in the last-mentioned series circuit and in another series circuit with said second resistor between said means for supplying said biasing voltage and said base electrode of said second transistor.

4. The invention according to claim 3 wherein said monostable multivibrator network includes a fifth resistor connected in series circuit with said first capacitor between said collector electrode of said first transistor and said second diode, and a second capacitor connected between said base electrode of said second transistor and said terminal at said reference potential.

5. The invention according to claim 1 wherein said means for supplying said first signal to said second transistor includes a signal input terminal, a third diode and means connecting said third diode between said signal input terminal and said second transistor; said signal seeking receiver also including a fourth diode connected to said third diode but with reverse polarity, and means for supplying a voltage to said fourth diode to reverse bias said fourth diode.

6. The invention according to claim 5 wherein said fourth diode is connected between said third diode and a terminal at a reference potential.

7. The invention according to claim 6 including a sixth resistor, said sixth resistor being connected between said fourth diode and said terminal at said reference potential, said means for supplying a voltage to said fourth diode to reverse bias said fourth diode including said sixth resistor and a DC path including a switch connected between said sixth resistor and said means for supplying said biasing voltage.

8. The invention according to claim 7 wherein said first and second transistors each have base, collector and emitter electrodes, and wherein said monostable multivibrator network also includes first, second, third and fourth resistors, a first capacitor and a coil of a relay having contacts in circuit with said motor, said first resistor being connected between said means for supplying said biasing voltage and said collector electrode of said second transistor, said second resistor being connected between said means for supplying said biasing voltage and said base electrode of said second transistor, said third and fourth resistors being connected in series circuit with each other between said collector electrode of said second transistor and a terminal at a reference potential, said third and fourth resistors having a common terminal connected to said base electrode of said first transistor, said coil being connected between said means for supplying said biasing voltage and said collector electrode of said first transistor, said first capacitor being connected between said collector electrode of said first transistor and said base electrode of said second transistor, and means connecting said emitter electrodes of said first and second transistors and said terminal at said reference potential.

9. The invention according to claim 8 wherein said monostable multivibrator network includes first and second diodes, said first diode being connected in a series circuit with said coil between said means for supplying said biasing voltage and said collector electrode of said first transistor and also in a series circuit with said coil and said first capacitor between said means for supplying said biasing voltage and said base electrode of said second transistor, said second diode also being connected in the last-mentioned series circuit and in another series circuit with said second resistor between said means for supplying said biasing voltage and said base electrode of said second transistor.